United States Patent Office 2,777,885
Patented Jan. 15, 1957

2,777,885

PREPARATION OF PHENYL MAGNESIUM CHLORIDE

Hugh E. Ramsden, Metuchen, N. J., assignor to Metal & Thermit Corporation, New York, N. Y., a corporation of New Jersey No Drawing. Application May 12, 1954,
Serial No. 429,393

13 Claims. (Cl. 260—665)

The present invention relates to a process of preparing phenyl magnesium chloride.

Although phenyl magnesium bromide has heretofore been known and used as a reagent, its high cost has rendered its use non-attractive. Consequently, it was once believed that phenyl magnesium chloride could be prepared more economically, thereby yielding a more desirable reagent. However, because of the extreme inertness of the aromatic chloride, the usual methods of preparing reagents in ether using chlorobenzene as a reactant was unsuccessful in the preparation of phenyl magnesium chloride. In the past, resort was made to extreme conditions of high temperature and pressure for a long period but even under these conditions disappointing yields were obtained. Such processes were objectionable, not only because of the poor yields of the desired reagent, but also because of the formation of tars as by-products which were difficult to remove.

It is an object of the present invention, economically to prepare phenyl magnesium chloride in high yield and purity by reacting chlorobenzene with magnesium at reflux temperatures of about 130–135° C. and preferably 130–132° C., in the presence of a sulfate catalyst. Suitable sulfate catalysts includes $ZnSO_4$, $CuSO_4$, $.5H_2O$, $Fe_2(SO_4)_3$, $HgSO_4$, $FeSO_4$, $SnSO_4$, $H_2SO_4$, $Na_2SO_4$, $NaHSO_4$, $CdSO_4$, $CoSO_4$, $.7H_2O$, $BaSO_4$, $CaSO_4$ and $PbSO_4$. It has been found that about 0.5–5% of the sulfate catalyst by weight of the magnesium is sufficient to effect catalyst of the reaction, 1%–2% being preferred.

The raw materials utilized in the present invention were standard commercial products. The magnesium utilized in the present invention did not necessarily possess a clean, unoxidized surface, but could be old and dirty. The magnesium may be in the form of turnings (resulting from milling), granular material (produced on a hammer-mill), or in other comminuted forms. Similarly, the chlorobenzene was not a pure product but contained the usual impurities found in the commercial products. Since chlorobenzene is usually prepared from industrial coal tar benzene, it is expected that small amounts of chlorothiophene may be present in the commercial product. On analysis, the chlorobenzene used was found to contain 0.18% sulfur. Likewise, the catalysts used in the present invention were ordinary untreated commercial products containing the usual impurities. Some of these chemicals are ordinarily purchased in the hydrated state and are used as such will no ill effects on the present process.

A feature of the present invention is the utilization of reflux temperatures of about 130–135° C. and preferably 130–132° C. at atmospheric pressure. This temperature range overcomes the disadvantages arising from the prior methods wherein superatmospheric pressures and higher temperatures were employed. The violent reaction which could ensue as a result of such severe conditions resulted in charring and in the formation of tars. With the present invention, the reaction between chlorobenzene and magnesium is easily controlled. The non-exothermicity of this reaction renders it necessary to employ heat in order to obtain reaction. It is possible by merely withdrawing the heat source to halt the reaction for a determined period of time which further application of heat will permit the reaction to continue. As about ten to twenty hours is necessary in order to obtain complete reaction between the magnesium and chlorobenzene, the removal of the heat source permits halting of the reaction when desired and its resumption at a future time.

Another embodiment of the present process resides in the advantageous use of a diluent or solvent during the reaction. It has been found that in the absence of a diluent, the reaction mixture becomes so viscous as to inhibit further reaction. It has also been found that charring may occur when no diluent is present during the reaction. This solvent may be present at the beginning of the reaction or may be added to the reaction mixture at any time after initiation of the reaction but before it has become unduly viscous. In view of the variety of catalysts and diluents useful herein, the last possible time for addition of the diluent and the quantities thereof must be determined separately for each material by simply observing the consistency of the mixture as the reaction progresses. Suitable solvents or diluents include chlorobenzene, benzene, toluene, xylene, phenyl ether, mixtures thereof and the like. If more than one mole of chlorobenzene per gram atom of magnesium is present in the reaction mixture, the excess chlorobenzene acts as a diluent and no other solvent need be added.

Another preferred embodiment of the instant invention resides in carrying out the reaction under an inert atmosphere. Although this is not essential in the present novel process, the exclusion of air and its displacement by nitrogen, for instance, results in a shorter initiation period. Other suitable inert gases include argon, neon, helium and krypton. By initiation period is meant the time from the beginning of reflux to the time the reaction actually commences. This period can generally vary over a range of fifteen minutes to about one hour and fifteen minutes. However, when this reaction is carried out under an inert atmosphere, an initiation period of only about twenty minutes to thirty-five minutes is observed. Another deleterious effect of the oxygen in the air on the reagent is the formation of phenols as a result of air oxidation. Thus, while an inert atmosphere is not essential in the instant process, it does provide additional advantages in the obtention of phenyl magnesium chloride in higher purity.

Still another embodiment of the invention resides in efficient agitation of the reaction mixture. It has been found that stirring is essential to the obtention of a high yield of a pure product. The absence of agitation may result in charring, a considerably longer initiation period and consequently a less economical process. The degree of agitation, namely the speed of the stirrers, affects the rapidity of the reaction. More specifically, rapid agitation on the order of 10,000 R. P. M. allows the reaction to be complete three hours after reflux (130° C.), whereas slow stirring, on the order of 100–200 R. P. M., may require 20 hours after reflux starts for completion. Furthermore, with rapid agitation the reaction commences before reflux temperatures of about 130° C. are reached, reaction being noted at 110° C.–118° C. Rapid agitation reduces the reaction period and is advantageous where rapidity is a desirable feature, but it is not essential in the present invention.

The phenyl magnesium chloride yields obtained by the process range from 75%–95% based on the weight of magnesium as compared to prior processes wherein a maximum of only 50% by weight of the magnesium has been obtained. This process affords a considerable saving, rendering the present process a commercially superior procedure for the manufacture of the phenyl magnesium chloride reagent. In addition, the catalytic initiation of the reaction between magnesium and chlorobenzene is brought about uniformly in fifteen to seventy-five minutes instead of the usual more lengthy period.

The following examples are further illustrative of the present invention, and it will be understood that the invention is not limited thereto:

Example I

One g. atom of magnesium turnings, 1.0 mole of commercial chlorobenzene, and 1% by weight of the magnesium of zinc sulfate were charged into a one liter, 3-necked flask equipped with a stainless steel anchor stirrer, reflux condenser, a thermometer, and a Glascol heater. All joints were glass. This mixture was stirred and heated to reflux. Thirty-five minutes after reflux began, a greenish color developed in the mix indicating that the reaction had started. Four additional moles of chlorobenzene was added to the reaction mixture 1 hour and 15 minutes after initiation of the reaction. Heating was continued for 19 hours and 25 minutes longer. The mixture was cooled, diluted with anhydrous ethyl ether and made up to one liter of solution in a volumetric flask by addition of more ether. The solution was shaken to disperse solids, allowed to settle for a moment, and a 20 ml. sample was pipetted into a 500 ml. Erlenmeyer flask containing 50 ml. water and 50 ml. of 0.5 N $H_2SO_4$. This mixture was heated on a steam bath for thirty minutes. 1.5 ml. of 0.04% bromocresol purple was used as an indicator for the back-titration with 0.2 N NaOH solution and the yield was calculated. This is the well known Gilman titration, somewhat modified. The yield for this run based on the titration was 92%.

The following table represents additional examples of the invention, wherein the apparatus, procedure and ingredients of Example I were utilized except as specified in the table. The specific catalyst and percentage of yield for each example varied as indicated therein, the percentage of yield being based on the magnesium content. The conditions of reaction for each experiment were varied by subjecting the reaction mixture to different reaction times as shown in the table. By initiation time is meant the time from the beginning of reflux, which is at about 130° C., until the reaction starts as evidenced by the development of a green color. By reaction time is meant the total time of refluxing of the reaction mixture after the reaction has started (i. e., time of reaction after initiation thereof). Other conditions that were varied during the reaction between the magnesium and chlorobenzene appear under the heading "Remarks." The yield of the final reaction product, phenyl magnesium chloride, was determined as in Example I, and was based on the magnesium content. In each example, commercial magnesium turnings, commercial chlorobenzene and commercial catalysts were used unless specified to the contrary.

| Example | Percent catalyst | Initiation time hrs. | Initiation time min. | Reaction time hrs. | Reaction time min. | Remarks | Percent yield |
|---|---|---|---|---|---|---|---|
| 1 | 1% $ZnSO_4$ | | 35 | 19 | 25 | Excess chlorobenzene added 1 hour and 15 minutes after initiation time. | 92 |
| 2 | 1% $Fe_2(SO_4)_3$ | | 15 | 19 | 45 | Same | 78.4 |
| 3 | 1% $CuSO_4 \cdot 5H_2O$ | (¹) | (¹) | 19 | 20 | Excess chlorobenzene added 1 hour 10 min. after reflux began. | 94.0 |
| 4 | 1% $H_2SO_4$ | | 35 | 19 | 25 | Excess chlorobenzene added 1 hour and 15 minutes after initiation time. | 86.2 |
| 5 | 1% $NaHSO_4$ | 1 | 5 | 18 | 55 | Same | 88.8 |
| 6 | 1% $Na_2SO_4$ | | 30 | 19 | 30 | Same | 92.8 |
| 7 | 1% $FeSO_4 xH_2O$ (the degree of hydration not exactly known. | | 30 | 19 | 30 | Same | 83.5 |
| 8 | 1% $CaSO_4$ | | 25 | 19 | 35 | Same | 87.5 |
| 9 | 1% $BaSO_4$ | | 15 | 19 | 45 | Same | 86.4 |
| 10 | 1% $CdSO_4$ | | 25 | 19 | 35 | Same | 89.1 |
| 11 | 1% $PbSO_4$ | | 25 | 19 | 35 | Same | 75.0 |
| 12 | 1% $HgSO_4$ | 1 | 5 | 18 | 55 | Same | 89.5 |
| 13 | 1% $SnSO_4$ | | 25 | 19 | 35 | Same | 87.1 |
| 14 | 1% $CoSO_4 \cdot 7H_2O$ | 1 | 15 | 18 | 45 | Same | 87.8 |

¹ Obscure.

This table discloses the advantages of the present process. The yield of phenyl magnesium chloride, based on Mg content is within the range of about 75–94%, as compared to a maximum of 50% in the prior art processes. Another advantage is apparent in the shorter initiation time of this process which is usually a matter of 15 minutes to about one hour and fifteen minutes. Still another advantage is apparent from the considerably shorter reaction time utilizable herein which is a period of 18–20 hours in lieu of the prior art period of days.

While the invention has been described with reference to various examples and embodiments, it will be apparent to those skilled in the art that various modifications may be made, and equivalents substituted therefor, without departing from the principles and true nature of the present invention.

What is claimed by Letters Patent is:

1. A method of preparing phenyl magnesium chloride which comprises reacting chlorobenzene with magnesium at reflux temperatures in the presence of an inorganic sulfate catalyst and recovering said phenyl magnesium chloride.

2. A method of preparing phenyl magnesium chloride which comprises reacting chlorobenzene with magnesium at reflux temperatures in the presence of a diluent and an inorganic sulfate catalyst, and recovering said phenyl magnesium chloride.

3. A method of preparing phenyl magnesium chloride which comprises mixing chlorobenzene, magnesium and an inorganic sulfate catalyst, agitating and heating said mixture to reflux temperatures, maintaining said mixture at reflux temperatures by the application of heat until the reaction is complete, and recovering phenyl magnesium chloride.

4. A method of preparing phenyl magnesium chloride which comprises mixing equimolecular amounts of chlorobenzene and magnesium, and 0.5–5% based on the weight of magnesium of an inorganic sulfate catalyst, agitating and heating said mixture to reflux temperatures, adding a diluent after the reaction has started but prior to completion thereof, maintaining said mixture at reflux temperatures by the application of heat until the reaction is complete, and recovering phenyl magnesium chloride.

5. A method of preparing phenyl magnesium chloride which comprises mixing equimolecular amounts of chlorobenzene and magnesium, and 0.5-5% based on the weight of magnesium of an inorganic sulfate catalyst, agitating and heating said mixture to reflux temperatures, adding additional chlorobenzene after the reaction has started but prior to completion thereof, maintaining said mixture at reflux temperatures by the application of heat until the reaction is complete, and recovering phenyl magnesium chloride.

6. A method of preparing phenyl magnesium chloride which comprises mixing chlorobenzene, magnesium, a diluent and an inorganic sulfate catalyst, agitating and heating said mixture to reflux temperatures, maintaining said mixture at reflux temperatures by the application of heat until the reaction is complete, and recovering phenyl magnesium chloride.

7. A method of preparing phenyl magnesium chloride which comprises reacting chlorobenzene with magnesium at reflux temperatures and in an inert atmosphere in the presence of an inorganic sulfate catalyst, and recovering said phenyl magnesium chloride.

8. A method of preparing phenyl magnesium chloride which comprises mixing chlorobenzene, magnesium and an inorganic sulfate catalyst, agitating and heating said mixture to reflux temperatures of about 130-132° C., maintaining said mixture at reflux temperatures of about 130-132° C. by the application of heat until the reaction is complete, and recovering phenyl magnesium chloride.

9. A method of preparing a phenyl magnesium chloride Grignard reagent which comprises reacting chlorobenzene with magnesium at reflux temperatures in the presence of an inorganic sulfate catalyst.

10. A method of preparing a phenyl magnesium chloride Grignard reagent which comprises reacting chlorobenzene with magnesium at reflux temperatures in the presence of a diluent and an inorganic sulfate catalyst.

11. A method of preparing a phenyl magnesium chloride Grignard reagent which comprises mixing equimolecular amounts of chlorobenzene and magnesium, and 0.5-5% of an inorganic sulfate catalyst, agitating and heating said mixture to reflux temperatures, adding a diluent after the reaction has started but prior to the completion thereof, and maintaining said mixture at reflux temperatures by the application of heat until the reaction is complete.

12. A method of preparing phenyl magnesium chloride Grignard reagents which comprises mixing equimolecular amounts of chlorobenzene and magnesium, and 0.5-5% of an inorganic sulfate catalyst, agitating and heating said mixture to reflux temperatures, adding additional chlorobenzene after the reaction has started but prior to completion thereof, and maintaining said mixture at reflux temperatures by the application of heat until the reaction is complete.

13. A method of preparing a phenyl magnesium chloride Grignard reagent which comprises mixing chlorobenzene, magnesium and an inorganic sulfate catalyst, agitating and heating said mixture to reflux temperatures of about 130-132° C., and maintaining said mixture at reflux temperatures of about 130-132° C. by the application of heat until the reaction is complete.

References Cited in the file of this patent

UNITED STATES PATENTS

| | | |
|---|---|---|
| 1,658,285 | Cox et al. | Feb. 7, 1928 |
| 2,056,822 | Britton et al. | Oct. 6, 1936 |
| 2,058,373 | Weissenborn | Oct. 20, 1936 |
| 2,462,391 | Hartough et al. | Feb. 22, 1949 |